United States Patent
Khoo et al.

(10) Patent No.: US 8,813,123 B2
(45) Date of Patent: *Aug. 19, 2014

(54) CONTENT WITH CUSTOMIZED ADVERTISEMENT

(75) Inventors: Denis Khoo, Los Angeles, CA (US); Raymond F Ratcliff, III, Plano, TX (US); Francis A Benevento, II, Palm Beach, FL (US)

(73) Assignee: InterAD Technologies, LLC, Tyler, TX (US)

( * ) Notice: Subject to any disclaimer, the term of this patent is extended or adjusted under 35 U.S.C. 154(b) by 1576 days.

This patent is subject to a terminal disclaimer.

(21) Appl. No.: 10/704,282

(22) Filed: Nov. 7, 2003

(65) Prior Publication Data

US 2004/0143843 A1    Jul. 22, 2004

Related U.S. Application Data

(63) Continuation-in-part of application No. 10/090,439, filed on Mar. 4, 2002, now Pat. No. 6,721,955, which is a continuation of application No. 09/487,120, filed on Jan. 19, 2000, now Pat. No. 6,434,747.

(51) Int. Cl.
| | |
|---|---|
| H04N 7/10 | (2006.01) |
| H04N 7/025 | (2006.01) |
| H04N 21/258 | (2011.01) |
| H04N 21/472 | (2011.01) |
| H04N 21/442 | (2011.01) |
| G06Q 30/02 | (2012.01) |
| H04N 21/475 | (2011.01) |
| H04N 21/478 | (2011.01) |
| H04N 7/173 | (2011.01) |
| H04N 21/658 | (2011.01) |
| H04N 21/482 | (2011.01) |
| H04N 21/81 | (2011.01) |

(52) U.S. Cl.
CPC ..... H04N 21/4755 (2013.01); H04N 21/25883 (2013.01); H04N 21/47202 (2013.01); H04N 21/44222 (2013.01); G06Q 30/02 (2013.01); H04N 21/47815 (2013.01); H04N 7/17318 (2013.01); H04N 21/6582 (2013.01); H04N 21/25891 (2013.01); H04N 21/4826 (2013.01); H04N 21/812 (2013.01)
USPC ........................................................ 725/34

(58) Field of Classification Search
None
See application file for complete search history.

(56) References Cited

U.S. PATENT DOCUMENTS

| | | | |
|---|---|---|---|
| 4,745,549 A | 5/1988 | Hashimoto | |
| 4,789,863 A | 12/1988 | Bush | |

(Continued)

FOREIGN PATENT DOCUMENTS

| | | |
|---|---|---|
| EP | 0355697 | 2/1990 |
| EP | 1 017 031 A2 | 7/2000 |

(Continued)

OTHER PUBLICATIONS

Samuelson, Paul A. and Nordhaus, William D., "Economics", 12th ed. (New York: McGraw-Hill, 1985): 59-72.

(Continued)

*Primary Examiner* — Nathan Flynn
*Assistant Examiner* — Omar S Parra
(74) *Attorney, Agent, or Firm* — Ascenda Law Group, PC (57) ABSTRACT

The invention provides a method and system for customizing advertisements to the individual viewer or user receiving a content which may be generic or customized, subject to or independent of, a broadcast schedule.

28 Claims, 5 Drawing Sheets

(56) References Cited

U.S. PATENT DOCUMENTS

| | | |
|---|---|---|
| 4,947,429 A | 8/1990 | Bestler |
| 4,995,078 A | 2/1991 | Monslow |
| 5,034,807 A | 7/1991 | Von Kohorn |
| 5,075,771 A | 12/1991 | Hashimoto |
| 5,130,792 A | 7/1992 | Tindell |
| 5,155,591 A | 10/1992 | Wachob |
| 5,264,933 A | 11/1993 | Rosser |
| 5,283,734 A | 2/1994 | Von Kohorn |
| 5,319,455 A | 6/1994 | Hoarty et al. |
| 5,367,330 A | 11/1994 | Haave |
| 5,371,551 A | 12/1994 | Logan |
| 5,410,344 A | 4/1995 | Graves et al. |
| 5,446,919 A | 8/1995 | Wilkins |
| 5,459,506 A | 10/1995 | Bushnell |
| 5,479,508 A | 12/1995 | Bestler |
| 5,483,276 A | 1/1996 | Brooks et al. |
| 5,483,278 A | 1/1996 | Strubbe et al. |
| 5,483,472 A | 1/1996 | Overman |
| 5,488,423 A | 1/1996 | Walkingshaw et al. |
| 5,500,681 A | 3/1996 | Jones |
| 5,508,731 A | 4/1996 | Kohorn |
| 5,515,098 A | 5/1996 | Carles |
| 5,515,270 A | 5/1996 | Weinblatt |
| 5,524,195 A | 6/1996 | Clanton |
| 5,532,735 A | 7/1996 | Blahut |
| 5,541,638 A | 7/1996 | Story |
| 5,564,073 A | 10/1996 | Takahisa |
| 5,572,442 A | 11/1996 | Schulhof |
| 5,583,763 A | 12/1996 | Atcheson et al. |
| 5,600,364 A | 2/1997 | Hendricks |
| 5,604,542 A | 2/1997 | Dedrick |
| 5,610,653 A | 3/1997 | Abecassis |
| 5,616,876 A | 4/1997 | Cluts |
| 5,619,249 A | 4/1997 | Billock et al. |
| 5,621,456 A | 4/1997 | Florin |
| 5,640,002 A | 6/1997 | Ruppert |
| 5,684,918 A | 11/1997 | Abecassis |
| 5,710,884 A | 1/1998 | Dedrick |
| 5,721,827 A | 2/1998 | Logan |
| 5,724,521 A | 3/1998 | Dedrick |
| 5,724,567 A | 3/1998 | Rose et al. |
| 5,732,216 A | 3/1998 | Logan |
| 5,734,720 A | 3/1998 | Salganicoff |
| 5,734,853 A | 3/1998 | Hendricks et al. |
| 5,740,549 A | 4/1998 | Reilly et al. |
| 5,745,710 A | 4/1998 | Clanton |
| 5,749,081 A | 5/1998 | Whiteis |
| 5,752,238 A | 5/1998 | Dedrich |
| 5,754,939 A | 5/1998 | Herz et al. |
| 5,758,072 A | 5/1998 | Filepp et al. |
| 5,758,259 A | 5/1998 | Lawler |
| 5,759,101 A | 6/1998 | Von Kohorn |
| 5,761,683 A | 6/1998 | Logan |
| 5,774,170 A | 6/1998 | Hite |
| 5,774,870 A | 6/1998 | Storey |
| 5,781,909 A | 7/1998 | Logan |
| 5,790,935 A | 8/1998 | Payton |
| 5,794,210 A | 8/1998 | Goldhaber |
| 5,801,747 A | 9/1998 | Bedard |
| 5,802,299 A | 9/1998 | Logan |
| 5,806,045 A | 9/1998 | Biorge et al. |
| 5,818,512 A | 10/1998 | Fuller |
| 5,832,457 A | 11/1998 | O'Brien et al. |
| 5,835,087 A | 11/1998 | Herz et al. |
| 5,838,314 A | 11/1998 | Neel |
| 5,848,396 A * | 12/1998 | Gerace ............................ 705/10 |
| 5,848,397 A | 12/1998 | Marsh |
| 5,861,881 A | 1/1999 | Freeman |
| 5,861,906 A | 1/1999 | Dunn et al. |
| 5,892,536 A | 4/1999 | Logan |
| 5,915,243 A | 6/1999 | Smolen |
| 5,926,624 A | 7/1999 | Katz et al. |
| 5,929,850 A | 7/1999 | Broadwin et al. |
| 5,931,901 A | 8/1999 | Wolfe |
| 5,933,811 A | 8/1999 | Angles et al. |
| 5,937,329 A | 8/1999 | Helmy |
| 5,945,988 A | 8/1999 | Williams et al. |
| 5,963,916 A | 10/1999 | Kaplan |
| 5,978,013 A | 11/1999 | Jones et al. |
| 5,986,692 A | 11/1999 | Logan |
| 6,002,393 A | 12/1999 | Hite |
| 6,005,561 A | 12/1999 | Hawkins et al. |
| 6,012,051 A | 1/2000 | Sammon, Jr. et al. |
| 6,012,080 A | 1/2000 | Ozden et al. |
| 6,018,738 A | 1/2000 | Breese et al. |
| 6,020,912 A | 2/2000 | Delang |
| 6,026,376 A | 2/2000 | Kenney |
| 6,029,045 A | 2/2000 | Picco |
| 6,057,872 A | 5/2000 | Candelore |
| 6,075,971 A | 6/2000 | Willians et al. |
| 6,088,455 A | 7/2000 | Logan et al. |
| 6,088,722 A * | 7/2000 | Herz et al. .................... 709/217 |
| RE36,801 E | 8/2000 | Logan |
| 6,101,483 A | 8/2000 | Petrovich |
| 6,131,087 A | 10/2000 | Luke |
| 6,134,532 A * | 10/2000 | Lazarus et al. ............. 705/14.25 |
| 6,177,931 B1 | 1/2001 | Alexander |
| 6,182,068 B1 | 1/2001 | Culliss |
| 6,189,008 B1 | 2/2001 | Easty |
| 6,199,076 B1 | 3/2001 | Logan et al. |
| 6,211,901 B1 | 4/2001 | Imajima |
| 6,216,129 B1 | 4/2001 | Eldering |
| 6,237,145 B1 | 5/2001 | Narashimhan |
| 6,246,997 B1 | 6/2001 | Cybul |
| 6,266,649 B1 | 7/2001 | Linden et al. |
| 6,282,293 B1 | 8/2001 | Itoh et al. |
| 6,282,713 B1 | 8/2001 | Kitsukawa et al. |
| 6,285,999 B1 | 9/2001 | Page |
| 6,317,881 B1 | 11/2001 | Shah-Nazaroff et al. |
| 6,324,338 B1 | 11/2001 | Wood |
| 6,324,519 B1 | 11/2001 | Eldering |
| 6,336,100 B1 | 1/2002 | Yamada |
| 6,338,043 B1 | 1/2002 | Miller |
| 6,366,100 B1 | 1/2002 | Yamada |
| 6,351,813 B1 | 2/2002 | Mooney et al. |
| 6,357,042 B2 | 3/2002 | Srinivasan |
| 6,386,450 B1 | 5/2002 | Ogasawara |
| 6,411,992 B1 | 6/2002 | Srinivasan et al. |
| 6,434,747 B1 | 8/2002 | Khoo et al. |
| 6,446,261 B1 | 9/2002 | Rosser |
| 6,457,010 B1 | 9/2002 | Eldering |
| 6,463,585 B1 | 10/2002 | Hendricks et al. |
| 6,477,704 B1 | 11/2002 | Cremia |
| 6,484,146 B2 | 11/2002 | Day |
| 6,490,587 B2 | 12/2002 | Easty |
| 6,505,240 B1 | 1/2003 | Blumenau |
| 6,526,577 B1 | 2/2003 | Knudson |
| 6,553,178 B2 | 4/2003 | Abecassis |
| 6,571,216 B1 | 5/2003 | Garg |
| 6,571,279 B1 | 5/2003 | Herz |
| 6,571,390 B1 | 5/2003 | Dunn |
| 6,594,825 B1 | 7/2003 | Goldschmidt Iki et al. |
| 6,606,644 B1 * | 8/2003 | Ford et al. .................... 709/203 |
| 6,609,106 B1 | 8/2003 | Robertson |
| 6,668,377 B1 | 12/2003 | Dunn |
| 6,698,020 B1 | 2/2004 | Zigmond et al. |
| 6,703,934 B1 | 3/2004 | Nijman et al. |
| 6,738,978 B1 | 5/2004 | Hendricks et al. |
| 6,760,916 B2 * | 7/2004 | Holtz et al. ..................... 725/34 |
| 6,799,327 B1 | 9/2004 | Reynolds et al. |
| 6,816,628 B1 | 11/2004 | Sarachik et al. |
| 6,820,277 B1 | 11/2004 | Eldering et al. |
| 6,850,564 B1 | 2/2005 | Pejhan et al. |
| 6,868,415 B2 | 3/2005 | Kageyama et al. |
| 6,904,449 B1 | 6/2005 | Quinones |
| 7,003,486 B1 | 2/2006 | Condamoor et al. |
| 7,080,030 B1 | 7/2006 | Eglen et al. |
| 7,100,111 B2 | 8/2006 | McElfresh et al. |
| 7,110,961 B1 | 9/2006 | Goino |
| 7,117,516 B2 | 10/2006 | Khoo et al. |
| 7,124,091 B1 | 10/2006 | Khoo et al. |
| 7,237,123 B2 | 6/2007 | LeVine et al. |
| 2001/0003845 A1 | 6/2001 | Tsukamoto |
| 2001/0021994 A1 | 9/2001 | Nash |

(56) References Cited

U.S. PATENT DOCUMENTS

| | | |
|---|---|---|
| 2002/0010759 A1 | 1/2002 | Hitson et al. |
| 2002/0065802 A1 | 5/2002 | Uchiyama et al. |
| 2002/0083444 A1 | 6/2002 | Blasko |
| 2002/0087400 A1 | 7/2002 | Khoo et al. |
| 2002/0100042 A1 | 7/2002 | Khoo et al. |
| 2002/0144153 A1 | 10/2002 | Levine |
| 2002/0144268 A1 | 10/2002 | Khoo et al. |
| 2002/0152465 A1 | 10/2002 | Khoo et al. |
| 2002/0165770 A1 | 11/2002 | Khoo et al. |
| 2002/0194143 A1 | 12/2002 | Banerjee et al. |
| 2003/0037334 A1 | 2/2003 | Khoo et al. |
| 2003/0041328 A1 | 2/2003 | Khoo et al. |
| 2003/0135853 A1* | 7/2003 | Goldman et al. ............... 725/34 |
| 2003/0226142 A1* | 12/2003 | Rand .............................. 725/32 |
| 2004/0019908 A1 | 1/2004 | Williams et al. |
| 2004/0049434 A1 | 3/2004 | Khoo et al. |
| 2004/0059708 A1 | 3/2004 | Dean et al. |
| 2004/0107434 A1 | 6/2004 | Khoo et al. |
| 2004/0117831 A1 | 6/2004 | Ellis et al. |
| 2004/0193488 A1 | 9/2004 | Khoo et al. |
| 2005/0021397 A1 | 1/2005 | Cui et al. |
| 2005/0033742 A1 | 2/2005 | Kamvar et al. |
| 2005/0065806 A1 | 3/2005 | Harik |
| 2005/0071328 A1 | 3/2005 | Lawrence |
| 2005/0222989 A1 | 10/2005 | Haveliwala et al. |
| 2005/0240580 A1 | 10/2005 | Zamir et al. |
| 2009/0030978 A1* | 1/2009 | Johnson et al. ............... 709/203 |
| 2009/0240589 A1* | 9/2009 | Vora et al. ..................... 705/14.6 |
| 2011/0145067 A1* | 6/2011 | Skillen et al. .............. 705/14.54 |

FOREIGN PATENT DOCUMENTS

| | | |
|---|---|---|
| EP | 1071278 | 1/2001 |
| EP | 1133745 | 9/2001 |
| EP | 1 150 505 A1 | 10/2001 |
| EP | 1172000 | 1/2002 |
| GB | 2 254 216 A | 9/1992 |
| GB | 2254216 | 9/1992 |
| GB | 2 304 489 A | 3/1997 |
| JP | 2000-194932 | 7/2000 |
| JP | 2001-359013 | 12/2001 |
| JP | 2002-074153 | 3/2002 |
| JP | 2003/259327 | 9/2003 |
| WO | WO 99/04561 | 1/1999 |
| WO | WO 9937045 | 7/1999 |
| WO | WO 9950778 | 10/1999 |
| WO | WO 99/59026 | 11/1999 |
| WO | WO 00/01151 | 1/2000 |
| WO | WO 00/33228 | 6/2000 |
| WO | WO 0043892 | 7/2000 |
| WO | WO 00/51050 | 8/2000 |
| WO | WO 00/64165 | 10/2000 |
| WO | WO 00/75801 | 12/2000 |
| WO | WO 01/54403 | 7/2001 |
| WO | WO 02/08930 A1 | 1/2002 |
| WO | WO 02/084502 | 10/2002 |
| WO | 2005033979 A1 | 4/2005 |

OTHER PUBLICATIONS

Masih, Rumi. "An empirical analysis of the demand for commercial television advertising," Applied Economics, 32, 2, 149(1), Feb. 1999.
"Major challenge for banks", Retail Banker International, pNA, Jun. 3, 1999, DIALOG(R)File 16, Record # 06418141.
Balabanovc et al. "Fab: Content-Based, Collaborative Recommendation," *Communications of the ACM*, vol. 40, No. 3, Mar. 1997.
Office Action issued in Application No. 03723835.9 mailed Apr. 4, 2008.
Office Action issued in related U.S. Appl. No. 10/659,080, dated May 29, 2008.
Japanese Office Action, with English translation, issued in Japanese Patent Application No. 2003-582743, dated Mar. 10, 2009.
United States Office Action issued in U.S. Appl. No. 11/321,652 dated Jul. 24, 2009.
Supplementary European Search Report issued in European Patent Application No. EP 03 73 9034, dated Feb. 3, 2009.
European Search Report in Application No. GB 0301076.6 mailed May 28, 2003.
Non-Final Office Action issued in related U.S. Appl. No. 11/497,560 mailed Sep. 12, 2008.
Office Action issued in copending U.S. Appl. No. 09/849,495, dated Aug. 10, 2007.
Non-Final Office Action issued in related U.S. Appl. No. 11/321,652 mailed Oct. 10, 2008.
Case No. 2:07-CV-158LED, *Individual Network, LLC*, vs. *Apple Inc.*, "Order", Joint Motion to Suspend all Deadlines and Vacate, Oct. 8, 2009.
First/Consequent Examination Report for Application No. 1957/DELNP/2006 mailed Nov. 19, 2009.
Japanese Office Action for Japanese Patent Application No. 553294/01, along with translation.
Case No. 2:07-CV-158LED, *Individual Network, LLC*, vs. *Apple Inc.*, "Apple Inc's Reply in Support of Evidentiary Objections to Individual Network's Response to Apple's Motion for Summary Judgment of Invalidity," Jun. 17, 2009.
Case No. 2:07-CV-158LED, *Individual Network, LLC*, vs. *Apple Inc.*, "Individual Network's Sur-reply to Apple Inc.'s Reply in Support of its Motion for Summary Judgment of Invalidity of Claims 1, 3, 4, 8, 9, 11, 13, 14, 15, 16, 18 and 19 of the Patent for Anticipation and Obviousness," Jun. 10, 2009.
Case No. 2:07-CV-158LED, *Individual Network, LLC*, vs. *Apple Inc.*, "Defendant Apple Inc.'s Evidentiary Objections to Individual Network's Response to Apple's Motion for Summary Judgment of Inequitable Conduct," May 29, 2009.
Case No. 2:07-CV-158LED, *Individual Network, LLC*, vs. *Apple Inc.*, "Memorandum Opinion" and Order, Appendix A, and Appendix B, Jan. 12, 2009.
Case No. 2:07-CV-158LED, *Individual Network, LLC*, vs. *Apple Inc.*, "Apple Inc.'s Reply in Support of Evidentiary Objections to Individual Network's Response to Apple's Motion for Summary Judgment of Inequitable Conduct," Attachments A-B, Jun. 17, 2009.
Case No. 2:07-CV-158LED, *Individual Network, LLC*, vs. *Apple Inc.*, "Individual Network's Response to Apple Inc.'s Evidentiary Objections to Individual Network's Response to Apple's Motion for Summary Judgment of Invalidity," Exhibit 1, Jun. 10, 2009.
Case No. 2:07-CV-158LED, *Individual Network, LLC*, vs. *Apple Inc.*, "Defendant Apple Inc.'s Evidentiary Objections to Individual Network's Response to Apple's Motion for Summary Judgment of Invalidity," May 29, 2009.
Case No. 2:07-CV-158LED, *Individual Network, LLC*, vs. *Apple Inc.*, "IN's Sur-Reply to Apple's Evidentiary Objections on Inequitable Conduct," Jun. 25, 2009.
Case No. 2:07-CV-158LED, *Individual Network, LLC*, vs. *Apple Inc.*, "Defendant Apple Inc.'s Reply in Support of its Motion for Summary Judgment of Invalidity Due to Lack of Written Description," Exhibits H and I, Jun. 10, 2009.
Case No. 2:07-CV-158LED, *Individual Network, LLC*, vs. *Apple Inc.*, "Individual Network LLC's Response to Apple, Inc.'s Motion for Summary Judgment of Invalidity on Claims 1-4, 8, 9, 11, 13-16, 9938 18, and 19 of the '516 Patent for Anticipation and Obviousness," Exhibits 1-15, proposed Order, May 18, 2009.
Case No. 2:07-CV-158LED, *Individual Network, LLC*, vs. *Apple Inc.*, "Individual Network's Sur-Reply to Apple Inc.'s Reply in Support of its Motion for Summary Judgment of Invalidity Due to Lack of Written Description," Jun. 17, 2009.
Case No. 2:07-CV-158LED, *Individual Network, LLC*, vs. *Apple Inc.*, "IN's Response to Apple's Evidentiary Objections on Inequitable Conduct," Exhibit 1, Jun. 10, 2009.
Case No. 2:07-CV-158LED, *Individual Network, LLC*, vs. *Apple Inc.*, "Individual Network LLC's Response to Apple, Inc.'s Motion for Summary Judgment of Invalidity Due to Lack of Written Description," Exhibit A, 1-8, Jun. 3, 2009.
Case No. 2:07-CV-00158 LED, *Individual Network, LLC*, vs. *Apple Inc.*, "Defendant Apple Inc.'s Motion for Summary Judgment of Inequitable Conduct, Request for Oral Argument," Exhibit A-Exhibit DD, Text of Proposed Order, Apr. 10, 2009.

(56) References Cited

OTHER PUBLICATIONS

Office Action in Inter Partes Reexamination issued in related Control No. 95/001,043 mailed Sep. 24, 2008.
Office Action in Inter Partes Reexamination issued in related Control No. 95/001,043 mailed Sep. 28, 2009.
Civil Action No. 2:07CV-158, *Individual Network, LLC* vs. *Apple, Inc.*, "Individual Network, LLC's Response to Defendant, Apple, Inc.'s Motion for Summary Judgment of Inequitable Conduct, Request for Oral Argument," Affidavit of Chanler Langham, Exhibit A-Exhibit O, May 11, 2009.
Case No. 2:07-CV-00158 LED, *Individual Network, LLC*, vs. *Apple Inc.*, "Apple Inc.'s Memorandum of Points and Authorities in Support of its Motion for Summary Judgment of Invalidity on Claims 1-4, 8, 9, 11, 13-16, 18, and 19 of the '516 Patent for Anticipation and Obviousness," Affidavit Declaration of David Bilsker, Exhibit 33-Exhibit 36, May 29, 2009.
Case No. 2:07-CV-00158 LED, *Individual Network, LLC* vs. *Apple Inc.*, "Apple Inc.'s Reply in Support of its Motion for Summary Judgment of Inequitable Conduct," Exhibit Ee-Exhibit II, May 29, 2009.
Civil Action 2:07CV158, *Individual Network, LLC* v. *Apple, Inc.*, 'IN's Sur-Reply to Apple's Motion for Summary Judgment of Inequitable Conduct,' Exhibit P-Exhibit T, Jun. 10, 2009.
Case No. 2:07-CV-00158 LED, *Individual Network, LLC* vs. *Apple Inc.*, "Defendant Apple Inc.'s Opposed Motion for Sanctions for Relying Upon Fabricated Evidence, Destroying Evidence, and Related Litigation Misconduct, Request for Oral Argument," Exhibit A-V, Text of Proposed Order, Aug. 13, 2009.
Case No. 2:07-CV-00158 LED, *Individual Network, LLC* vs. *Apple Inc.*, "Apple Inc.'s Supplemental Brief in Support of its Motion for Summary Judgment of Inequitable Conduct," Exhibit JJ-Exhibit LL, Aug. 24, 2009.
Case No. 2:07-CV00158 LED, *Individual Network, LLC* vs. *Apple Inc.*, "IN's Response to Apple's Motion for Sanctions," Exhibit A-Exhibit B, Exhibit 1-25, Exhibit 30, Proposed Order, Aug. 31, 2009.
Case No. 2:07CV158, *Individual Network, LLC* vs. *Apple Inc.*, "IN's Response to Apple's Supplemental Brief on Inequitable Conduct" Exhibit V-Exhibit Z, Sep. 15, 2009.
Case No. 2:07-CV-00158 LED, *Individual Network, LLC* vs. *Apple Inc.*, "Apple Inc.'s Reply in Support of its Motion for Sanctions," Exhibit W-Exhibit CC, Sep. 16, 2009.
Civil Action 2:07CV158 LED, *Individual Network, LLC* vs. *Apple Inc.*, "IN's Sur-Reply to Apple's Motion for Sanctions," Exhibit 26-Exhibit 32, Sep. 30, 2009.
Civil Action No. 2-07CV-158; *Individual Network, LLC* vs. *Apple Inc.*, Original Complaint With Jury Trial Demand against Apple Inc., filed by Individual NetwOrk, LLC., Apr. 24, 2007.
Case No. 2:07-CV-00158 LED, *Individual Network, LLC* vs. *Apple Inc.*, "Apple Inc.'s Answer to Plaintiffs Complaint for Patent Infringement and Counterclaims for Invalidity, Nonfringement, Unenforceability, and Infringement," Exhibit A, Jul. 2, 2007.
Case No. 2:07-CV-00158 LED, *Individual Network, LLC* vs. *Apple Inc.*, "In Response to Apple's Counterclaims: Individual Network's Answer, Affirmative Defenses, and Counterclaims," by Individual Network, LLC., Jul. 25, 2007.
Case No. 2:07-CV-00158 LED, *Individual Network, LLC* vs. *Apple Inc.*, Amended Answer to Plaintiff's Complaint for Patent Infringement and, Counterclaim for invalidity, Noninfringement, Unenforceability, and Infringement against Individual Network, LLC. By Apple, Inc., Attachment A, Jan. 18, 2008.
Case No. 2:07-CV-00158 LED, *Individual Network, LLC* vs. *Apple Inc.*, "Individual Network's Answer to Apple Inc.'s Amended Counterclaims," Jan. 30, 2008.
Case No. 2:07-CV-00158 LED, *Individual Network, LLC* vs. *Apple Inc.*, Joint Claim Construction and Prehearing Statement of Plaintiff Individual Network, LLC Ahd Defendant Apple Inc., Exhibit A-Exhibit C, Jul. 16, 2008.
Case No. 2:07-CV-00158 LED, *Individual Network, LLC* vs. *Apple Inc.*, "Order," Jul. 24, 2008.
Case No. 2:07-CV-00158 LED, *Individual Network, LLC* vs. *Apple Inc.*, "Apple Inc.'s Answer to Plaintiffs Amended Complaint for Patent Infringement and Counterclaims for Invalidity, Noninfringement, Unenforceability, and Infringement," Aug. 11, 2008.
Case No. 2:07-CV-00158 LED, *Individual Network, LLC* vs. *Apple Inc.*, "Amended Joint Claim Construction and Prehearing Statement of Plaintiff Individual Network, LLC and Defendant Apple Inc.," Amended Exhibit A-Exhibit B, Aug. 29, 2008.
Case No. 2:07-CV-00158 LED, *Individual Network, LLC* vs. *Apple Inc.*, "Second Amended Joint Claim Construction and Prehearing Statement of Plaintiff Individual Network, LLC and Defendant Apple Inc.," Exhibit A-Exhibit B, Sep. 3, 2008.
Case No. 2:07-CV-00158 LED, *Individual Network, LLC* vs. *Apple Inc.*, "Apple Inc.'s Opening Claim Construction Brief," Exhibit A, Sep. 3, 2008.
Case No. 2:07-CV-00158 LED, *Individual Network, LLC* vs. *Apple Inc.*, "Plaintiff Individual Network, LLC's Opening Claim Construction Brief Pursuant to Patent Rule 4-5(a)," Exhibit 1-Exhibit 4, Sep. 3, 2008.
Case No. 2:07-CV-00158 LED, *Individual Network, LLC* vs. *Apple Inc.*, "Apple Inc.'s Responsive Claim Construction Brief Concerning Individual Network's '516 Patent," Affidavit of Jason T. Anderson, Exhibit A-Exhibit D, Sep. 19, 2008.
Case No. 2:07-CV-00158 LED, *Individual Network, LLC* vs. *Apple Inc.*, "Plaintiff Individual Network, LLC's Responsive Brief Pursuant to Patent Rule 4-5(b)," Affidavit of Chanler A. Langham, Exhibit 1-Exhibit 3, Attachment 1, Sep. 22, 2008.
Case No. 2:07-CV-00158 LED, *Individual Network, LLC* vs. *Apple Inc.*, "Apple Inc.'s Reply Claim Construction Brief," Sep. 26, 2008.
Case No. 2:07-CV-00158 LED, *Individual Network, LLC* vs. *Apple Inc.*, "Individual Network, Inc.'s Reply Regarding Claim Construction of '516 Patent," Affidavit of Chanler A. Langham, Exhibit 1-Exhibit 4, Sep. 26, 2008.
Case No. 2:07-CV-00158, *Individual Network, LLC* vs. *Apple Inc.*, Transcript of Markman Proceedings held on Oct. 8, 2008 before Judge Leonard Davis, Court Reporter. Shea Sloan, shea_sloan@txed.uscourts.gov.
Case No. 2:07-CV-00158 LED, *Individual Network, LLC* vs. *Apple Inc.*, ", Apple Inc.'s Memorandum of Points and Authorities in Support of Its Motion for Summary Judgment of Invalidity on Claims 1-4, 8, 9, 11, 13-16, 18, and 19 of the '516 Patent for Anticipation and Obviousness," Text of Proposed Order, Apr. 30, 2009.
Case No. 2:07-CV-00158 LED, *Individual Network, LLC* vs. *Apple Inc.*, "Declaration of David Bilsker in Support of Apple Inc.'s Motion for Summary Judgment of Invalidity on Claims 1-4, 8, 9, 11, 13-16, 18, and 19 of the '516 Patent for Anticipation and Obviousness," Exhibit 1-Exhibit 32, Apr. 30, 2009.
Case No. 2:07-CV-158LED, *Individual Network, LLC*, vs. *Apple Inc.*, "Defendant Apple Inc.'s Motion for Summary Judgment of Invalidity Due to Lack of Written Description," Exhibit A-G, Order, May 13, 2009.
Case No. 2:07-CV-158LED, *Individual Network, LLC*, vs. *Apple Inc.*, "IN's Sur-Reply to Apple's Motion for Summary Judgment of Inequitable Conduct," Affidavit of Chanler A. Langham, Exhibits S and U, Jun. 11, 2009.
Case No. 2:07-CV-158LED, *Individual Network, LLC*, vs. *Apple Inc.*, "Proposed Joint Pretrial Order," Exhibits J-L, Sep. 30, 2009.
S. Loeb, "Architecting Personalized Delivery of Multimedia Information," Communications of the AMC; Dec. 1992.
Canadian Office Action for Divisional Patent Application No. 2,578,831 dated Feb. 8, 2010.
Notice of Preliminary Rejection from the Korean Patent Office dated Nov. 27, 2009 for Korean Patent Divisional Application No. 2009-7016079.
English translation of Office Action from Israel Patent Office dated Jan. 14, 2010 in Israel Patent Application No. 182204.
Office Action issued in related copending U.S. Appl. No. 10/659,080 dated May 29, 2008.
U.S. Appl. No. 60/413,536, entitled "Methods and Apparatus for Serving Relevant Advertisements," filed Sep. 24, 2002 and listing Jeffrey A. Dean, Georges R. Hank and Paul Bucheit as inventors.

(56) References Cited

OTHER PUBLICATIONS

U.S. Appl. No. 10/314,427, entitled "Methods and Apparatus for Serving Relevant Advertisements," filed Dec. 6, 2002 and listing Jeffrey A. Dean, Georges R. Hank and Paul Bucheit as inventors.
U.S. Appl. No. 10/375,900, entitled "Serving Advertisements Based on Content," filed Feb. 26, 2003 and listing Darrell Anderson, Paul Bucheit, Alex Carobus, Claire Cui, Jeffrey A. Dean, Georges R. Hank, Deepak Jindal, and Narayanan Shivakumar as inventors; and.
U.S. Appl. No. 10/452,830, entitled "Serving Advertisements Using Information Associated With E-Mail," filed Jun. 2, 2003 and listing Jeffrey A. Dean, Georges R. Harik and Paul Bucheit as inventors.
U.S. Appl. No. 60/489,322, entitled "Collecting User Behavior Data Such as Click Data, Generating User Behavior Data Representations, and Using User Behavior Data for Concept Reinforcement for Content-Based Ad Targeting," filed Jul. 22, 2003 and listing Alex Carobus, Claire Cui, Deepak Jindal, Steve Lawrence and Narayanan Shivakumar as inventors.
Japanese Office Action issued in Japanese Patent Application No. 545394/06.
Search Report issued in European Patent Application No. 10075160.9 dated Jul. 14, 2010.
Non-Final Office Action dated Oct. 27, 2010 for U.S. Appl. No. 11/321,652.
Non-Final Office Action dated Jun. 15, 2011 for U.S. Appl. No. 11/321,652.
Korean Notice of Decision to Reject an Amendment, with English translation, issued in Korean Patent Application No. 10-2009-7016079, mailed Nov. 24, 2010.
Office Action issued in related U.S. Appl. No. 10/659,080 on Sep. 19, 2007.
European Search Report in Applicaton No. 03723835.9 mailed Feb. 19, 2008.
Non-Final Office Action in U.S. Appl. No. 10/645,157 mailed Feb. 21, 2008.
Search Report issued on May 28, 2003 by The UK Patent Office in related Application No. 0301076.6.

* cited by examiner

CONTENT WITH CUSTOMIZED ADVERTISEMENT

CROSS REFERENCE TO RELATED APPLICATION

This Application is a Continuation-In-Part of application Ser. No. 10/090,439, filed Oct. 31, 2002; which is a Continuation of application Ser. No. 09/487,120 (now U.S. Pat. No. 6,434,747).

BACKGROUND OF THE INVENTION

1. Field of the Invention

The present invention relates generally to the transmission of broadcast media over a data network, and more particularly to, a method and system for providing a customized media list to a user over that data network, such that customized advertisements can be individually tailored to customized or uncustomized content.

2. Description of the Related Art

Figure 1:
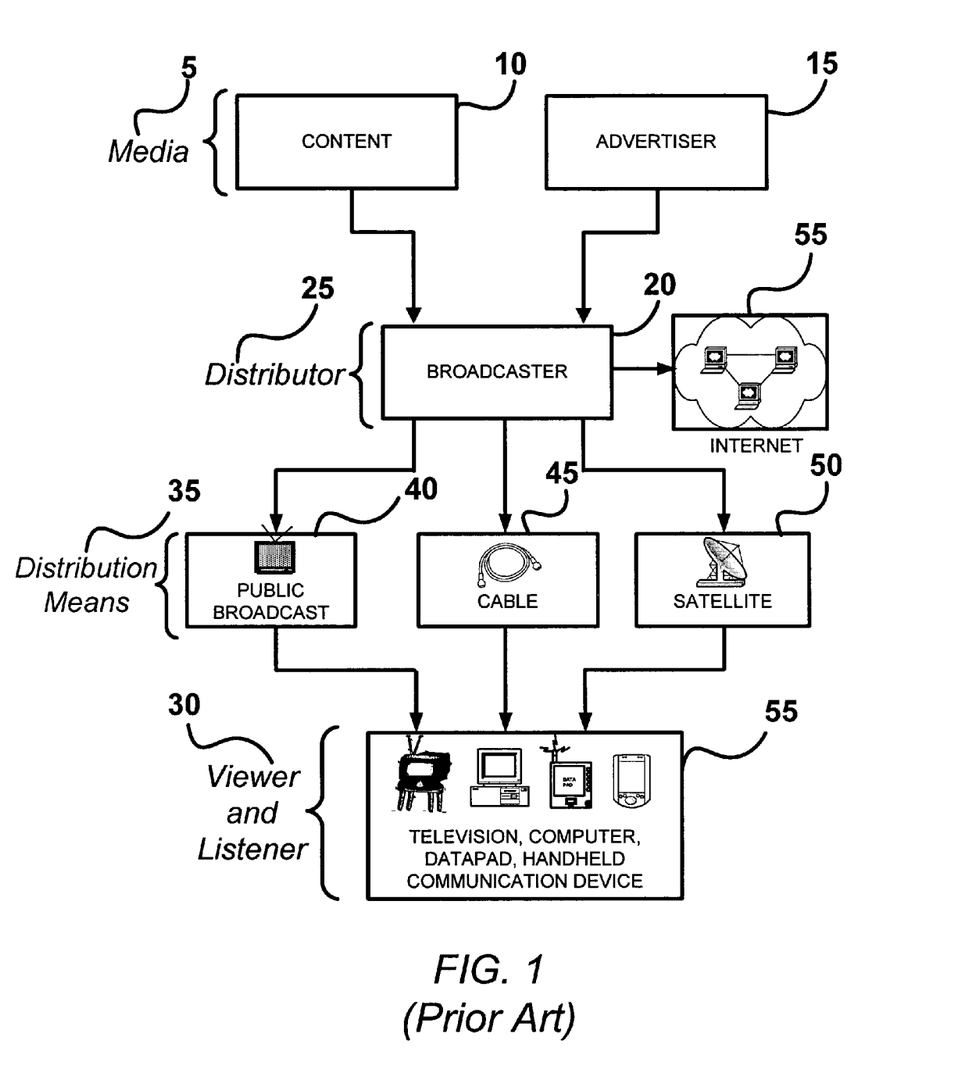
FIG. 1 is a prior art block diagram view of a broadcast media industry paradigm.

Broadcast media (including visual and audio media over any electronic network) has been provided to viewers and listeners for decades and typically falls under the paradigm illustrated in prior art FIG. 1. Prior art FIG. 1 is a block diagram view of a conventional broadcast media paradigm. In prior art FIG. 1, media 5, includes both content 10 (e.g. television shows, sports, news, weather, movies, concerts, etc.) and advertising 15. The content 10 is provided to the viewer. and listener for entertainment or information purposes, while the advertising 15 is typically used to provide revenues for the broadcaster 20. The broadcaster 20 also shares the advertising revenues with the content 10 providers. Thus, from FIG. 1, the broadcaster 20 is the distributor 25 of the content 10 and the advertising 15 to the viewer and listener 30 through a distribution means 35. The distribution means 35 includes public broadcast 40, cable 45 distribution and satellite 50 distribution, and internet 55 distribution. In essence, the broadcaster 20 distributes the content 10 and advertising 15 through the distribution means 35 and generally shares the costs of distributing such content 10 and advertising 15 with the viewer and listener 30 through the distribution means 35 to a video or audio receiver, such as television, computer, handheld communication device, or datapad 65.

Advertisers are subjected to several disadvantages with the paradigm art FIG. 1. As is known, advertisers can only guess as to the number of the target audiences viewing the content 10. Well known audience surveyors only estimate the number or actual viewers and listeners that watch and listen to the content 10 and advertising 15. The advertisers 15 target audiences based on such estimated ratings. Thus, advertisers are paying for advertising that may never reach the full target audience. This is because the advertisement is not reaching 100 percent of the target audience. In fact, it has been widely reported that only 5% of advertisements reach any viewers at all, a phenomenon that will be heightened by the proliferation of such screeners as TIVO and the cable services and receptors that have currently or soon will have TIVO-like features built in. Taken in the meaning of this art, the term 'advertiser', encompasses both an advertising provider and a content provider involved in tailoring advertisements for the individual or specific users.

Another disadvantage with the paradigm of prior art FIG. 1 is that television and radio channels are not customized to individual viewers and listeners, thus making targeted advertisement virtually impossible.

Moreover, a disadvantage is found in the fact that broadcast television and most cable and satellite content 10 is subject to a schedule, which viewers and listeners may not always be available to adhere to. Thus, they are forced to miss the scheduled content or record the content with devices that can block out conventional advertisements.

A need therefore exists for a method and system that mitigates or removes these disadvantages.

SUMMARY OF THE INVENTION

The invention provides a method for an advertiser providing a customized advertisement over a data network to a viewer/user, the customized advertisement being presented together with or placed within generic or customized digitized media delivered over an electronic network, such as broadcast television, cable satellite, the internet, and any wireless assisted communication system. Such delivery may or may not be subject to a broadcast schedule. The customized advertisement may take the form of a periodic intermittent message or a product or service placed within the content itself.

The customized advertisement is selected for the individual viewer/user based on a viewer's expressed preference or viewing habits, wherein the preferences or viewing habits are transmitted over the data network to the advertisers or content distributors or others contracting with the advertisers to reach targeted audiences. Such contractors may include a time frame for reaching the targeted audience.

The data network may include a communication layer, content module, or selection menu. The data network may include a content display device, an intelligent television, a computer, personal digital assistant or a cellular telephone According to one embodiment the advertisement is customized according to viewer/user responses to an offered selection of advertisements over the data network during or before content distribution.

The advertisement is selected directly or indirectly by the viewer/user from messages, products, product information, or purchase offers.

The advertiser can also be a content provider.

The selection menu may be based on a profile data, including viewing habits, of the viewers.

In one embodiment the viewer preferences, profiles or viewing habits are provided only to the advertisers.

In another embodiment of the method of the invention, the data network connects advertiser, content provider and individual viewer/user by viewing and communication means, so as to transmit advertisements by the viewers/users during transmission of the content to when the advertisements or advertised products or services added or embedded within.

There are several different ways in which the individualized advertisement can be brought to the attention of the viewer. One way would entail interrupting a broadcast of, e.g., a show, movie or news report (newscast) such that the advertisement would break into or interrupt the content transmission. Another way would mean incorporating the advertisement concurrently but spatially separately from the broadcast. The third way to a customized advertisement would integrate the advertisement or advertised products or services into the content of the broadcast thereby modifying the broadcast contract with individualized messages in the form of labeled products, for example.

Figure 4:
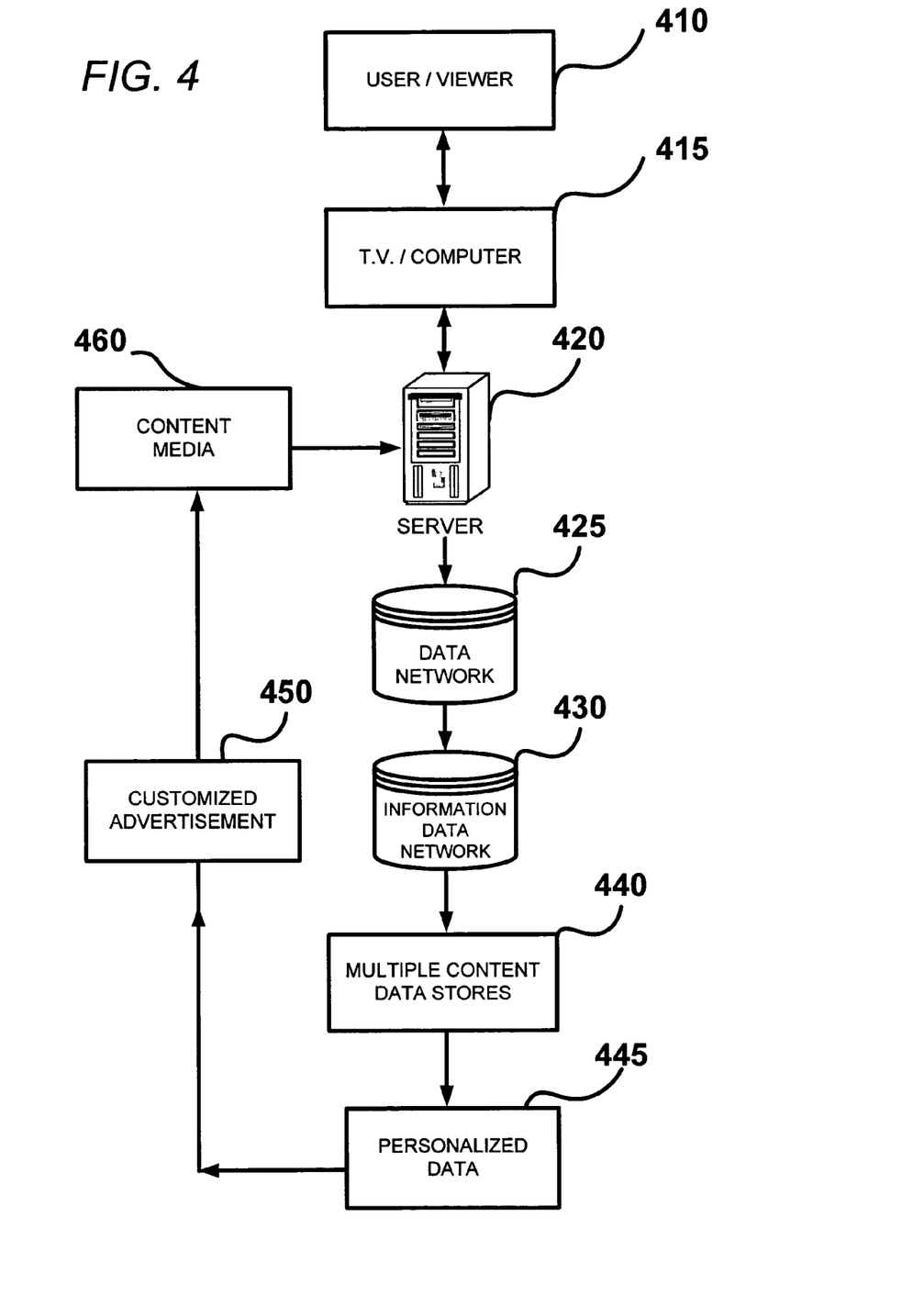
FIG. 4 is a block diagram view of an embodiment of the user of the present invention.
Figure 5:
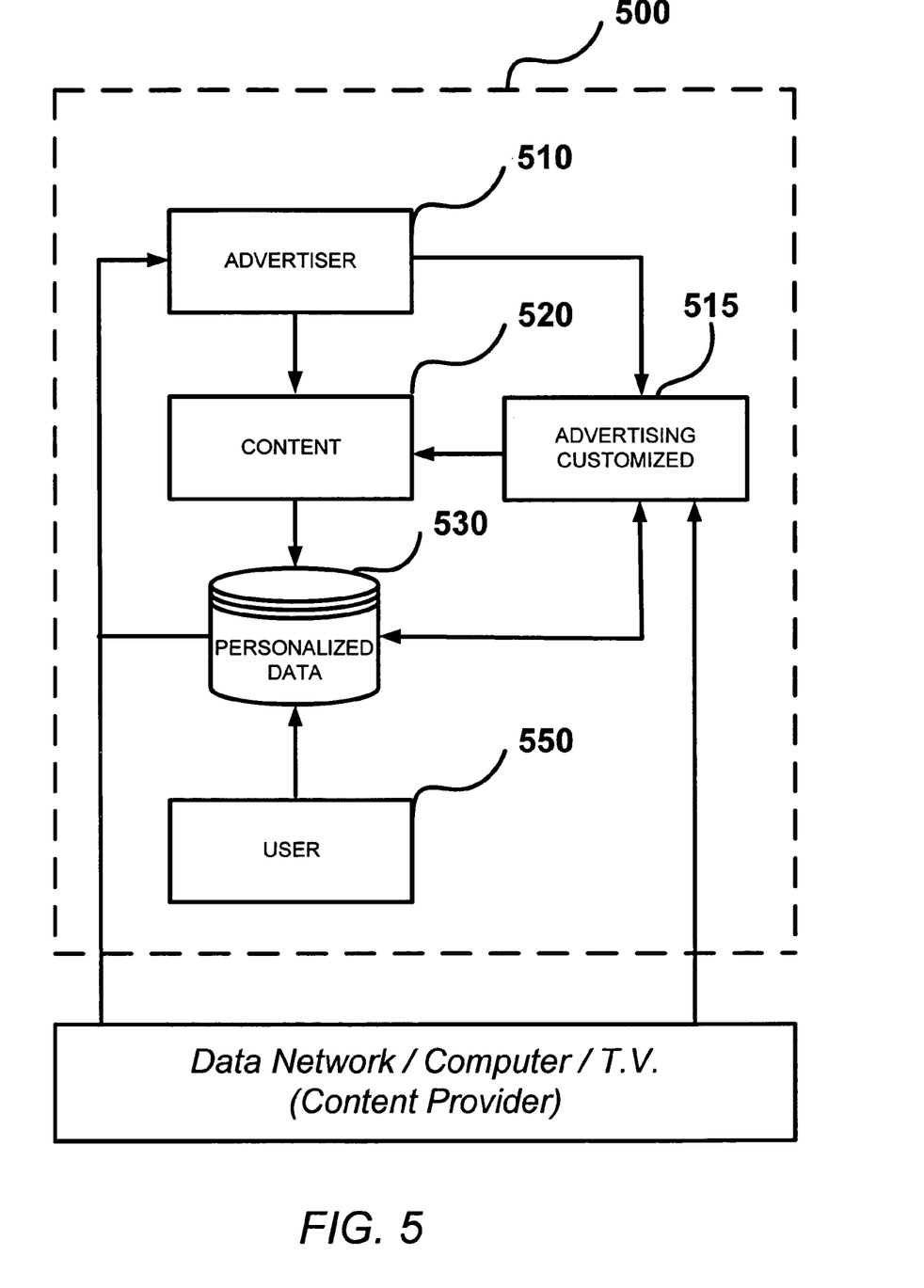
FIG. 5 is a block diagram view of an embodiment of the advertising modification of content to user system.

More specifically, reference is taken to the customized advertisement associated or presented with or placed into or within the content of FIGS. 4 and 5, in particular.

The invention provides an embodiment to combine individualized advertisements with content, which content may or may not customized and may or may not be subject to a broadcast schedule.

In particular, individual searches conducted through electronic network search engines would add an individually tailored advertisement to the category or characteristics. For example, the category of search could generate individually tailored advertisements related to education (on-line degree), art history (group trip to Paris), medicine (insurance, drugs), nursing (upcoming course offerings), religion (books or tapes), mechanics (tools, magazines), archeology (upcoming "dig" advertised on-line), or meteorology (telescopes).

The present invention provides customized advertising presented with or placed into content, be it generic or customized, subject to, or independent of, a broadcast schedule.

BRIEF DESCRIPTION OF THE DRAWINGS

A more complete appreciation of the invention and any of the advantages thereof will be readily obtained as the same becomes better understood by reference to the detailed description when considered in connection with the accompanying drawings, wherein.

DETAILED DESCRIPTION OF THE PREFERRED EMBODIMENTS

Figure 2:
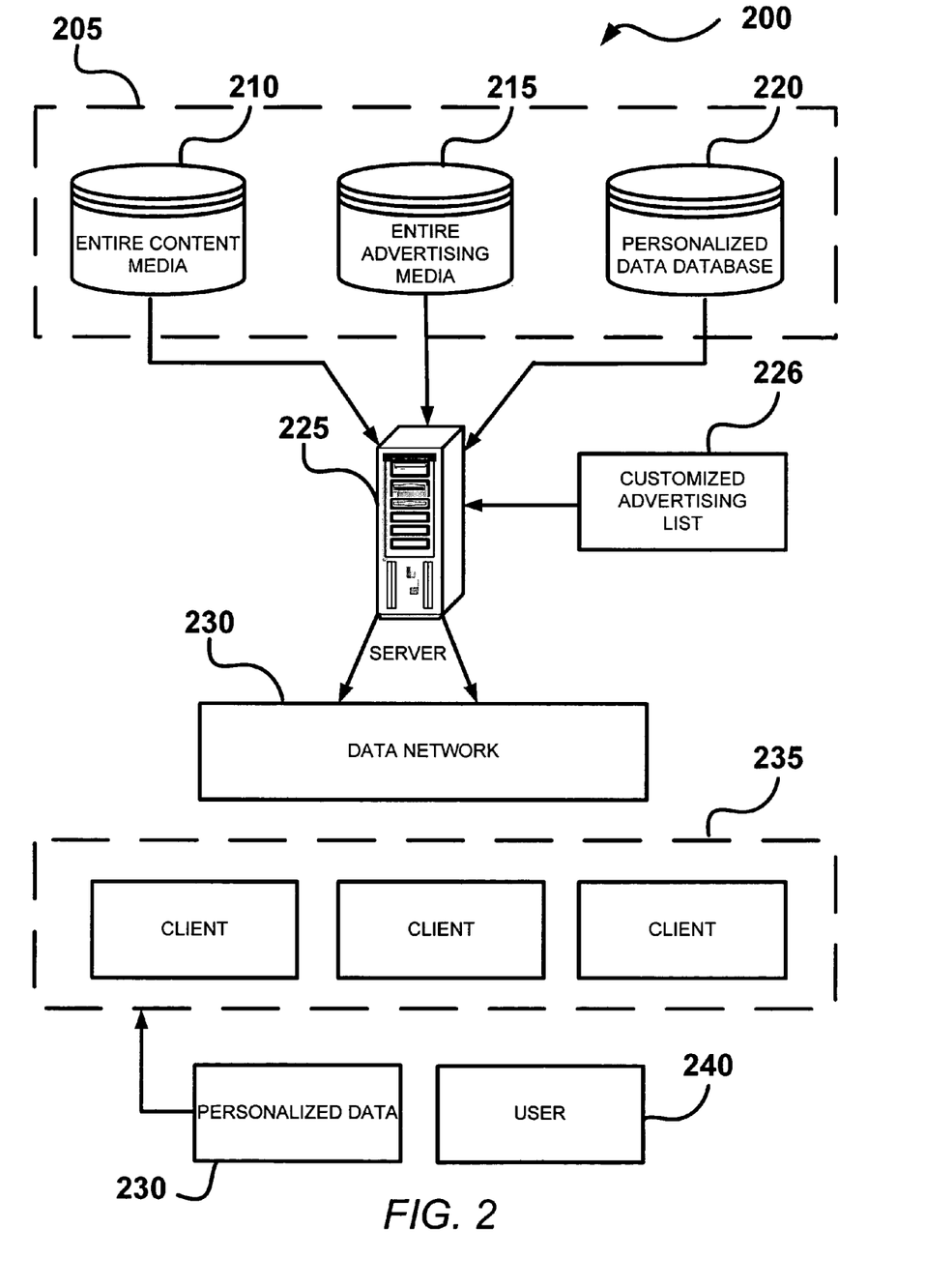
FIG. 2 is a block diagram view of an embodiment of the computer system of the present invention.

FIG. 2 is a block diagram view of an embodiment of the computer system of the present invention. In FIG. 2, a computer system 200 is shown having a server storage medium 205. The server storage medium 205 may be any type of storage device as are well known in the art, for example, any type of disc including floppy disc, optical disc, DVD, CD-ROMS, magnetic optical discs, RAM, EPROM, EEPROM, magnetic or optical cards, or any type of storage media that is suitable for storing electronic instructions/data. The server storage medium 205 contains individual databases including an entire content media 210, an entire advertising media 215 and a personalized data database 220 of a user 240. It is noted that the personalized database 220 may also contain personalized data of multiple users. Each of these databases store either content 210, advertising 215 or personalized data 220 for use in the computer system 200 using an embodiment of the method of the present invention as described below. The computer system 200 further includes a server 225, which may have the embodiment of any general purpose computer as shown in FIG. 7 described below. It is noted that the computer system 200, as shown in the embodiment of FIG. 2, shows a server 225 and client 235 as two separate general purpose computers (FIG. 7). However, as is apparent to one skilled in the art, the server 225 and client 235 connected by the data network 230 may, in fact, be a single general purpose computer, where the data network 230 is a bus rather than a data network such as the Internet. That is, while the embodiment of FIG. 2 shows the server and client as separate entities, those entities may in fact be one general purpose computer.

Still in FIG. 2, a data network 230 connects the server 225 and the client 235. The data network 230 may be an Internet, an Intranet, an ethernet-type bus, or any type of connection that is able to transfer data between the server 225 and client 235. In one embodiment, the data network 230 is the Internet, where data is transmitted from different geographical locations where the server 225 and the client 235 are located. The server 225 includes a server processor (not shown), which may be any well-known central processing unit (CPU) or a microprocessor (whether a single microprocessor or a plurality of microprocessors). The server processor, in one embodiment of the present invention, generates a customized media list 226 from personalized data 241 that is entered by the user 240 to the client 235. Thus, as more fully described below, a user 240 will provide personalized data 241 to the client 235. Again, the client 235 is a computer system 200, which may be any general purpose computer.

After the user provides a profile 241 to the client 235, that profile 241 is transferred through the data network 230 to the server 225, which is also part of the computer system 200. Once at the server 225, a server processor generates a customized advertisement list 226 from said profile by reviewing the entire advertising media 215 to match it to profile 241 to create a customized advertisement list 226. By match, it is understood that particular algorithms are provided, within the server 225, in order to provide a customized advertisement list 226. The match occurs using properties of the advertising 215 as described below. An algorithm, a personalized advertising service module (FIG. 3), generates a customized advertising list 226. The algorithm is created using software programming techniques that may be programmed using languages such as Java, C++ or any basic conditional programming language. Any such algorithm would attempt to optimize the targeted viewers' response to the customized advertising.

Once the customized advertisement list 226 is generated by the server 225 using the algorithm described above, said list is transmitted through the data network 230 by any transmitting means. In one embodiment, the transmitting means would be any means of data communications including modem lines, cable, satellite, DSL, fiber optic lines or other well-known similar means for transmitting data between two remote locations. In a further embodiment, the transmitting means may be the bus described in the general purpose computer. Furthermore, the client 235 may be a single client, or a single general purpose computer such as the computer (FIG. 1), or may be multiple clients as shown in FIG. 2. A client processor (not shown) retrieves the selected customized advertising. That is, the client 235 receives the content to be associated with the customized advertisement, then the client processor may retrieve the selected customized advertising from other locations, based on the customized advertisement list 226. Once at the client 235, the content and customized advertisement list 226 are stored on a client storage medium. Again, the client storage medium may be any type of medium as described with regard to the server storage medium and the general purpose computer of FIG. 1.

Figure 3:
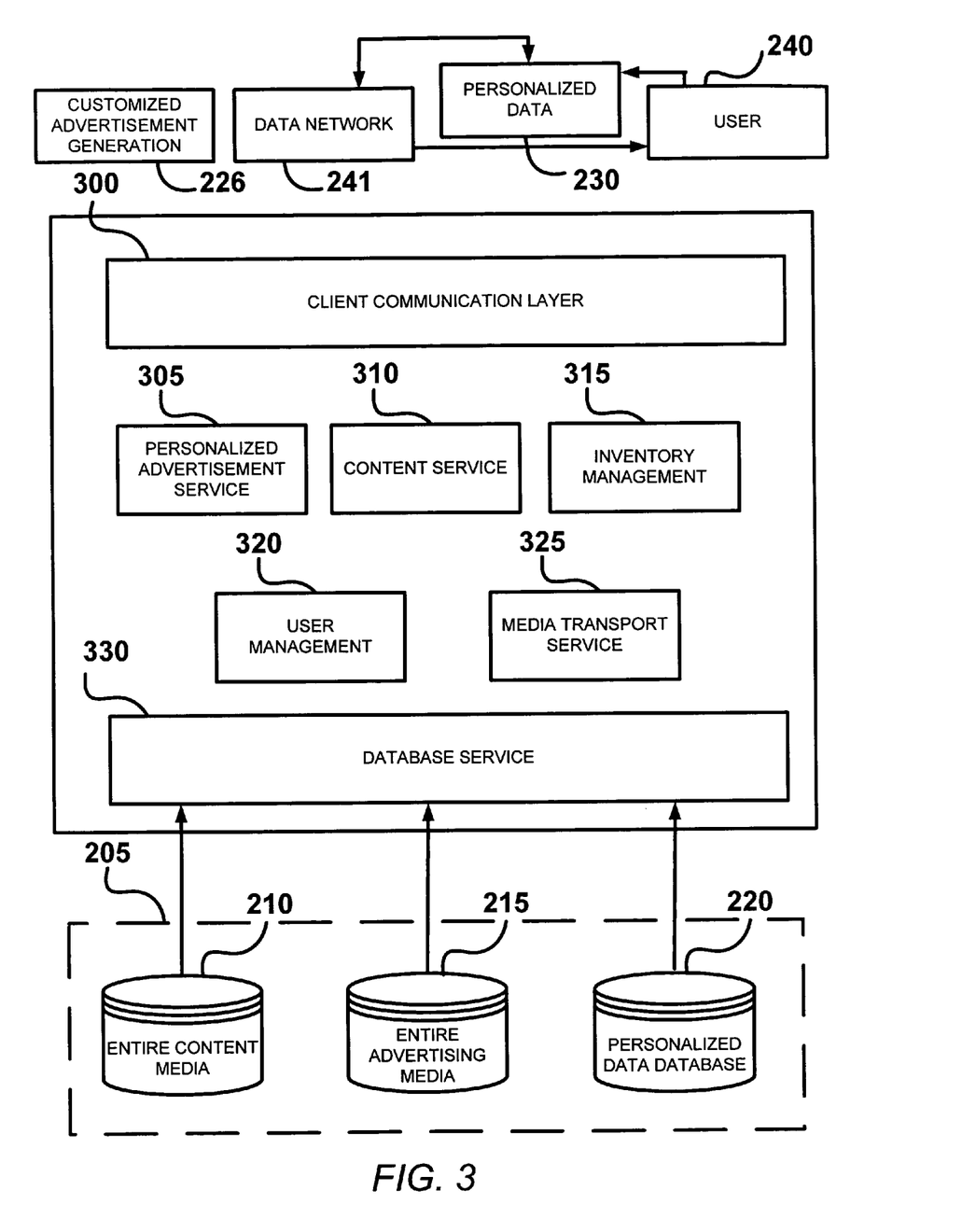
FIG. 3 is a block diagram view of an embodiment of the server of the present invention.

FIG. 3 is a block diagram view of the server 225 shown in FIG. 2. In FIG. 3, various software layers or modules are shown within the server 225. As is well known to one skilled in the art, these layers or modules are implemented in computer code to perform the functions described herein. It is noted that while the server 225 is shown with the layers or modules depicted in FIG. 3, various other hardware and software modules may exist within server 225 including, for example, the server processor, storage means, etc. to make the server a general purpose computer as exemplified in the embodiment shown in FIG. 1.

Still in FIG. 3, the server 225 is in communication with the data network 230 as depicted in FIG. 2. Within the server 225 are multiple software modules and/or layers. A client communication layer 300 manages the manner in which the server 225 communicates with the user 240. The client communications layer 300 is replaceable depending on the type of data network 230 utilized as well as the type of client utilized. Also in the server 225 is a personalized advertisement service module 305. The personalized advertisement service module 305 matches the advertisement contained in the entire advertising media 215 to the viewers' profiles. It is noted that these modules are implemented using software programming languages as described above. Also contained on the server 225 is the inventory management module 315. This module 315 works in conjunction with the personalized advertisement service module 305 efficiently provide those services 305 to a user. That is, the inventory management 315 is shared by the module 305.

The user management module 320 is used by the server 225 to receive the personalized data 241 of FIG. 3 and store such information on typical storage mediums. The user management module 320 takes the personalized data that consists of the personal profile of the user, the television show preference of the user and the past viewing habits of the user and stores that data on a storage medium in the server 225. That information is later transmitted to the personalized advertisement service module 305 that is later used to generate the customized advertisement list being returned to the user. The media transport service module 325 is also located on the server 225 and performs the function of retrieving the customized advertising that is based on the customized advertisement list 226. The media transport service module 325 communicates with the advertising media 210 to deliver the customized advertising to the user. It is noted that the server storage medium 205 contains the entire content media 215, the entire advertising media 210 and the profile of the user may be physical databases contained within the server or, in a further embodiment, may be databases located throughout remote data networks or remote servers that may be retrieved by the server 225. The database service module 330, much like the client communication layer 300, facilitates the communication between the server storage medium 205 and the modules 305, 310, 315, 320 and 325.

Numerous advantages exist with the method and system of the present invention as claimed below.

For example, with reference to the embodiment diagrammed in FIG. 4, the user/viewer 410 utilizes either through intelligent television or computer system 415 to access information. The computer system 415 encompasses electronic data storage in the server device 420 as aforementioned. The server device 420 accesses the data network 425 to receive information network data 430. Depending on the type of information sought, the user 410 gains information content data from the multiple content data stores 440. The targeted content of the multiple content data stores 440 can be added to the personalized data 445 which then are used to modify, customize or individualize advertisement 450 which is fed back in return to the server 420.

In an embodiment diagrammed in FIG. 5, the user/viewer 550 and advertiser 510 are connected and operate within a data network through a computer device or intelligent TV 500. The advertiser 510 receives information in the form of personalized data 530 from the user 550. The personalized data 530 are utilized by the advertiser 510 to modify or select advertising 515. The individually customized advertisement 515 is added to content 520 offered to the user/viewer 550.

First, advertisers now have highly personalized data on each user so that the advertising may be directed closely to the particular audience that advertisers wish to attract. Second, with knowledge of the personal data on the user/viewer, advertisers may be more confident in the percentage of those users/viewers that fit within its specific target audience, thereby reaching a higher percentage of that target audience than in the past.

Although the present invention has been described in detail with respect to certain embodiments and examples, variations and modifications exist which are within the scope of the present invention as defined in the following claims.

We claim:

1. A method for providing a customized video advertisement over a data network to a searcher, the method comprising:
   generating, in response to a search initiated by the searcher over the data network, a search answer list including a plurality of search answers, the search answer list being customized based on personalized data of the searcher;
   transmitting the search answer list over the data network from the computer system to a searcher device, wherein the search answer list is presented on the searcher device but is not permanently stored at the searcher device for subsequent presentation to the searcher;
   generating, in response to the search initiated by the searcher over the data network, an advertisement list indicating a plurality of video advertisements, wherein the advertisement list is (i) customized based on the personalized data of the searcher and the customized search answer provided to the searcher in response to the search and (ii) related to a category of the search;
   transmitting the advertisement list over the data network from the computer system to the searcher device, wherein the advertisement list is presented on the searcher device but is not permanently stored at the searcher device for subsequent presentation to the searcher; and
   providing the searcher device, over the data network and in response to a searcher's selection, with at least one video advertisement corresponding to the searcher's selection selected from said advertisement list in addition to at least one search answer from said search answer list,
   wherein said personalized data is not processed local to the user.

2. The method of claim 1, wherein the search is conducted by the searcher through an electronic network search engine.

3. The method of claim 1, wherein the data network includes an Internet.

4. The method of claim 1, wherein the data network comprises communication links between an advertiser, a content provider, a content owner and the searcher.

5. The method of claim 1, wherein the personalized data includes a personal profile.

6. The method of claim 1, wherein the personalized data includes a television show preference.

7. The method of claim 1, wherein the personalized data includes past viewings.

8. The method of claim 1, wherein the at least one of the plurality of video advertisements is directly related to the category of the search.

9. The method of claim 1, wherein the personalized data of the searcher includes preferences of the searcher for specific categories, products, or services.

10. The method of claim 1, wherein the at least one of the plurality of video advertisements is a periodic intermittent message or a product or service placed within the search result.

11. The method of claim 1, wherein the at least one of the plurality of search answers represents video media, the method further comprising transmitting the at least one of the plurality of search answers on the data network from the computer system to the searcher device.

12. A method for generating a customized media list, the method comprising steps of:
receiving, at a server, a search query from a client device, the client device being coupled to the server through a data network;
identifying a search answer, in response to the search query, the search answer being customized based on personalized data associated with a user of the client device;
updating the personalized data associated with the user of the client device based on the customized search answer;
identifying a video advertisement responsive to the search query, the video advertisement being customized based on the updated personalized data associated with the user of the client device;
generating a customized media list including the customized video advertisement; and
transmitting, through the data network and to the client device, the customized media list.

13. The method of claim 12, wherein the video advertisement is being customized based on the customized search answer and one or more other parameters included in the personalized data associated with the user of the client device.

14. The method of claim 13, wherein the one or more parameters included in the personalized data comprise a personal profile.

15. The method of claim 13, wherein the one or more other parameters included in the personalized data comprise a television show preference.

16. The method of claim 13, wherein the one or more other parameters included in the personalized data comprise past viewings.

17. The method of claim 13, wherein the one or more other parameters included in the personalized data comprise data entered by the user of the client device.

18. The method of claim 12, wherein the data network includes an Internet.

19. The method of claim 12, wherein the data network comprises communication links between an advertiser, a content provider, a content owner and the user of the client device.

20. The method of claim 12, wherein the client device includes a general purpose computer.

21. The method of claim 12, wherein identifying the customized video advertisement includes identifying a customized video advertisement that is configured to optimize the user's response to the customized video advertisement.

22. The method of claim 12, wherein the customized video advertisement is related to a category of the search.

23. The method of claim 12, wherein the personalized data of the searcher includes preferences of the searcher for specific categories, products, or services.

24. The method of claim 12, wherein the customized video advertisement includes a periodic intermittent message or a product or service placed within a search result.

25. The method of claim 12, wherein the search answer represents video media.

26. The method of claim 12, wherein identifying the customized video advertisement includes:
comparing properties of advertisements included in an advertising storage medium to the personalized data associated with the user of the client device; and
selecting the customized video advertisement based on the result of comparison.

27. The method of claim 12, wherein the customized media list includes the customized search answer.

28. A method for providing a customized video advertisement over a data network to a searcher, the method comprising:
generating, in response to a search initiated by the searcher over the data network, a search answer list including a plurality of search answers, the search answer list being customized based on personalized data of the searcher;
transmitting the search answer list over the data network from the computer system to a searcher device, wherein the search answer list is presented on the searcher device;
updating the personalized data based on the customized search answer;
generating, in response to the search initiated by the searcher over the data network, an advertisement list indicating a plurality of video advertisements, wherein the advertisement list is generated based on the updated personalized data of the searcher and (ii) related to a category of the search;
transmitting the advertisement list over the data network from the computer system to the searcher device, wherein the advertisement list is presented on the searcher device;
retrieving, in response to a searcher's selection, at least one video advertisement corresponding to the searcher's selection selected from the advertisement list; and
providing, over the data network, the retrieved at least one video advertisement in addition to the search answer list with the searcher.

* * * * *